United States Patent [19]

Heyes et al.

[11] Patent Number: 4,946,063
[45] Date of Patent: Aug. 7, 1990

[54] METAL CAN ENDS WITH METAL PULL TABS BONDED THERETO

[75] Inventors: Peter J. Heyes, Wantage; Robert A. Owen, Faringdon, both of England

[73] Assignee: CMB Packaging (UK) Limited, Worcester, England

[21] Appl. No.: 378,215
[22] PCT Filed: Oct. 12, 1988
[86] PCT No.: PCT/GB88/00848
§ 371 Date: Jun. 9, 1989
§ 102(e) Date: Jun. 9, 1989
[87] PCT Pub. No.: WO89/03350
PCT Pub. Date: Apr. 20, 1989

[30] Foreign Application Priority Data

Oct. 15, 1987 [GB] United Kingdom ............... 8724246

[51] Int. Cl.⁵ .............................................. B65D 17/34
[52] U.S. Cl. ..................................... 220/270; 220/269; 220/276
[58] Field of Search ............... 220/268, 269, 270, 276; 53/412

[56] References Cited

U.S. PATENT DOCUMENTS

| | | | |
|---|---|---|---|
| 4,248,653 | 2/1981 | Gerber | 156/272 |
| 4,403,710 | 9/1983 | Hirota et al. | 220/270 |
| 4,428,494 | 1/1984 | Hirota et al. | 220/270 |
| 4,548,333 | 10/1985 | Kobayashi et al. | 220/276 |
| 4,712,706 | 12/1987 | Nakata et al. | 220/276 |
| 4,735,336 | 4/1988 | Buchner et al. | 220/270 |
| 4,828,135 | 5/1989 | Kawakami et al. | 220/270 |

FOREIGN PATENT DOCUMENTS 204799 6/1986 European Pat. Off. .
223517 5/1987 European Pat. Off. .

OTHER PUBLICATIONS

Abstract from Japan Patent 61139421, Jun. 26, 1986.
Derwent Abstract No. 86-207868.

Primary Examiner—David T. Fidei
Attorney, Agent, or Firm—Burns, Doane, Swecker & Mathis

[57] ABSTRACT

A metal can end (10) has a metal pull tab (16) attached to a score-defined detachable portion (15) of the can end by direct welding of protective polymer coatings (19,20) whose surfaces at least are derived from the same monomer and which are provided on the upper side of the can and the under side of a shank portion (18) of the pull tab. The coatings may be composite films each comprising an inner layer of a bonding resin and an outer layer of a polyolefin, polyamide or polyester. The welding may be effected by heat or preferably by ultrasonic energy.

22 Claims, 3 Drawing Sheets

METAL CAN ENDS WITH METAL PULL TABS BONDED THERETO

This invention relates to metal can ends with metal pull tabs bonded thereto, and more specifically to such can ends which are provided with a score line defining an area of the can end which can be detached by tearing along the score line to form an aperture and with a metal pull tab having a shank portion attached to the upper side of the said area.

BACKGROUND OF THE INVENTION

Conventional "easy-open" can ends have a metal pull tab secured by a rivet formed in the metal of the area defined by the score line. Use of a rivet requires that a relatively soft formable metal be used for the can end, which must consequently be relatively thick to resist internal pressure or vacuum, while the rivet is prone to corrosion due to damage to protective coatings on the metal caused during the formation of the rivet. It has previously been proposed in European Patent Application No. 82305528.0, published under No. 0078625A1, to secure a pull tab to the score-defined area by means of an adhesive, without a rivet. To achieve adequate adhesion and protection, we believe that this would require use of special external lacquers, with attendant cost disadvantages, while the adhesive would have to be accurately located and metered and would be relatively slow to bond, thus increasing process time.

SUMMARY OF THE INVENTION

According to the present invention, in a metal can end provided with a score line defining an area of the can end which can be detached by tearing along the score line to form an aperture and with a metal pull tab having a shank portion attached to the upper side of said area, the upper side of the can end is provided with a protective polymer coating and the under side of the shank of the pull tab is also provided with a polymer coating, the surface at least of said coating on the shank portion being based on the same monomer as the polymer of the surface at least of the coating on the upper side of the can end and said surfaces are directly welded to one another.

By the use of coatings on the can end and pull tab which are directly welded to one another, the disadvantages attendant on the use of adhesives are avoided and good adhesion and protection can be obtained, while the process time for forming the can end can be kept relatively short. Furthermore, the absence of a rivet means that a thinner, harder steel can be used for the can end, and the cost of the metal can accordingly be reduced. The coating on the pull tab may be thermally welded to the coating on the can end, or it may be ultrasonically welded to it. Use of ultrasonic welding enables the weld to be effected without heating the metal or any part of the coatings except that part involved in making the weld, and thus avoids any risk of thermally induced effects adjacent the weld, for example recrystallisation of the polypropylene or polyester, or softening of the coating adjacent the weld during welding which might lead to damage if contacted while soft. It also avoids the need to allow process time for cooling or to provide additional equipment for cooling the affected area.

Preferably the upper and under sides of the can end both have protective polymer coatings which have been applied simultaneously, e.g. by the use of the techniques described and claimed in our copending British Patent Application No. 8724237.

In one embodiment of the invention, the coatings on the upper side of the can end and on the under side of the shank portion of the pull tab both have an outer layer of a polyamide. In this case, the said coatings preferably both consist of a composite film comprising an inner layer of a bonding resin which is an acid-modified polyolefin resin containing carboxyl or anhydride groups and an outer layer of a polyamide adhered to the inner layer of said bonding resin. A preferred bonding resin is a maleic anhydride graft modified polypropylene containing 0.05 to 0.5 maleic anhydride and based on a random ethylene/propylene copolymer.

In an alternative embodiment, the coatings on the upper side of the can end and on the under side of the shank portion of the pull tab are both of a polyolefin or have an outer layer of a polyolefin. In this case, the said coatings both preferably consist of a composite film comprising an inner layer of a bonding resin which is an acid-modified polyolefin resin containing carboxyl or anhydride groups and an outer layer of a polyolefin adhered to the inner layer of said bonding resin.

In a further alternative embodiment, the coatings on the upper side of the can end and on the under side of the shank portion of the pull tab both have an outer layer of a polyester. In this case, the said coatings preferably both consist of a composite film comprising an inner layer of a substantially non-crystalline linear polyester having a softening point below 150° C. and a melting point between 150° and 240° C. and an outer layer of a linear polyester having a melting point above 220° C., such as polyethylene terephthalate.

Further particulars of the composite films referred to above are contained in our British Patent Application No. 8724237.

The invention also resides in a process for forming a metal can end, of the kind provided with a score line defining an area which can be detached by tearing along the score line to form an aperture and with a metal pull tab having a shank portion attached to the upper side of the said area, wherein the can end is formed from metal stock provided with a protective polymer coating on its upper side, a polymer coating whose surface at least is based on the same monomer as the polymer of the surface at least of the coating on the upper side of the can end is also applied to the under side of the shank portion of the pull tab, and the surface of the coating on the under side of the shank portion of the pull tab is then directly welded to the surface of the polymer coating on the upper side of the can end.

Where thermal welding of the coatings is used, the pull tab and the can end may be brought together and held in register under pressure while heat is supplied to the shank portion to effect fusion of the coatings. Heat may be supplied from an electrically heated tool applied to the upper side of the shank portion. Alternatively heat may be supplied by induction heating.

Where ultrasonic welding is used to achieve fusion of the coatings, the ultrasonic welding may be effected by applying a vibrated horn to the upper side of the shank portion of the pull tab while the can end is supported on an anvil. Frequencies of the order of 20,000 cycles per second are effective and can be applied by an aluminium or preferably a titanium horn.

When the coatings on the upper side of the can end and on the under side of the pull tab are both composite films having an outer layer of a polyolefin, it is preferred that the polyolefin in the outer layer (B2) is polypropylene, or an ethylene-propylene copolymer. Layer B2 preferably contains an inorganic anti-blocking agent of particle size 0.5 to 5 microns e.g. synthetic silica.

The bonding resin layer (B1) in a composite film (B) may be an acid-modified polyolefin resin containing carboxyl or anhydride groups, as mentioned above. Typical acids for use in preparing such acid-modified polymers are ethylenically unsaturated carboxylic acids such as acrylic acid, methacrylic acid, maleic acid, fumaric acid, crotonic acid, and itaconic acid. Typical anhydrides used for the same purpose are ethylenically unsaturated carboxylic anhydrides such as maleic anhydride.

The acid groups can be present as copolymers of ethylene, for example ethylene/acrylic acid (EAA) or ethylene/methacrylic acid (EMAA). Typically the acid concentration is 5 to 15%.

The acid modification of the acid modified polymers can be obtained, for example, by grafting maleic anhydride to a polyolefin such as polypropylene, polyethylene, ethylene-propylene or ethylene-vinylacetate copolymer. The graft can be introduced by techniques such as reacting maleic anhydride with polyolefin in solution in an organic solvent and using a free radical catalyst such as dibenzoyl peroxide or dicumyl peroxide. Alternatively, an active centre can be introduced into the polymer by using high energy radiation such as gamma rays or X-rays and then reacting the resultant material with the anhydride.

The anhydride graft-modified polyolefin can be diluted with further unmodified polyolefin to produce a bonding resin preferably having a content of grafted acid (i.e. a graft level) of 0.02 to 0.6% most preferably $0.2\pm0.05\%$, measured by, analysis of infra red adsorption at 1790 cm$^{-1}$, of resin pre-dried at 200° C. to convert acid functionality to anhydride functionality. The diluting unmodified polyolefin can be the same polyolefin which has been used to produce the acid modified polyolefin, or it can be a different polyolefin. Thus, for example, an acid modified low-density polyethylene (LDPE) or linear low-density polyethylene (LLDPE) can be diluted with polypropylene, or an acid modified polypropylene can be diluted with a polypropylene or an ethylene propylene random copolymer.

The purpose of the inner layer (B1) of bonding resin is to tie the outer layer (B2) of polyolefin to the metal surface. Preferably when the outer polyolefin layer (B2) is a polypropylene homopolymer or an ethylene-propylene copolymer, the bonding resin base of inner tie layer (B1) is a polypropylene or an ethylene propylene random copolymer.

Preferably, for a bonding resin layer based on polypropylene, the bonding resin melt flow index is 3 to 30 gm/10 minutes, measured at 230° C. by the ASTM test No. D1238.

Particularly preferred bonding resin layers are based on random ethylene-propylene copolymers or blends of linear low-density polyethylene (LLDPE) with polypropylene.

A particularly preferred acid modified olefin copolymer is maleic-anhydride modified ethylene vinyl acetate.

The layer of bonding resin (B1) is preferably continuous and of a thickness of from 1 to 10 microns, and the outer layer (B2) is preferably of a thickness of from 10 to 30 microns.

When the coatings on the upper side of the can end and on the under side of the pull tab are both composite films having an outer layer of a polyamide, it is preferred that each film (B) comprises a plurality of layers in the following order:
(B1) an inner layer of a bonding resin which is an acid modified polyolefin resin containing carboxyl or anhydride groups,
(B2) a layer of a polyolefin,
(B3) a further layer of a bonding resin which is as defined for layer (B1), and
(B4) a layer of a polyamide.

The polyamide layer (B4) in the laminated metal sheet of the invention is preferably Nylon 6, Nylon 66, Nylon 11 or Nylon 12.

Preferably the polyolefin in layer (B2) is polypropylene, or polyethylene, or an ethylene-propylene copolymer. If desired other polyolefins such as polymethyl pentene may be used.

The bonding resin in each of layers (B1) and (B3) is an acid-modified polyolefin resin containing carboxyl or anhydride groups as described above.

The purpose of the inner layer (B1) of bonding resin is to tie the layer (B2) of polyolefin to the metal surface. When the polyolefin layer (B2) is a polyethylene, the bonding resin base of the inner tie layer (B1) is preferably a polyethylene or an ethylene copolymer. When the polyolefin layer (B2) is a polypropylene homopolymer or an ethylene-propylene copolymer, the bonding resin base of inner tie layer (B1) is preferably a polypropylene or an ethylene propylene random copolymer.

The purpose of layer (B3) of bonding resin is to tie the outer polyamide layer (B4) to the polyolefin layer (B2); the bonding resin layer (B3) is preferably based on polyethylene or polypropylene. Most preferably, the polyolefins in film (B) are propylene based.

Preferably, for a bonding resin layer based on polypropylene, the bonding resin melt flow index is 3 to 30 gm/10 minutes, measured at 230° C. by the ASTM test No. D1238.

Particularly preferred bonding resin layers are based on random ethylene-propylene copolymers or blends of low-density polyethylene (LDPE) with polypropylene or blends of linear low-density polyethylene (LLDPE) with polypropylene.

A particularly preferred acid modified olefin copolymer is maleic-anhydride modified ethylene vinyl acetate.

The layer (B1) of bonding resin in the composite polymer film (B) is preferably continuous and of a thickness of from 1 to 10 microns, more preferably 2 to 5 microns.

The layer (B3) of bonding resin in the composite polymer film (B) is preferably continuous and of a thickness of from 1 to 10 microns, more preferably 2 to 5 microns.

If desired, particularly in the coating on the upper side of the can end, any of layers (B1) to (B4) may be pigmented in conventional manner, with titanium dioxide for example. The preferred arrangement is for pigment to be in layer (B2) or in layers (B2) and (B4). Preferably the outer polyamide layer (B4) may contain inorganic anti-blocking agents such as synthetic silica having a particle size of from 0.5 to 5 microns.

BRIEF DESCRIPTION OF THE DRAWINGS

Specific embodiments of the invention will now be described in more detail by way of example and with reference to the accompanying drawings, in which:

As seen in FIG. 1, a metal can end 10 has a central panel 11 with an outwardly flared raised edge portion 12 and a curved periphery 13 for double-seaming to a can side wall (not shown). The central panel 11 is formed with a score 14 enclosing an area 15 of roughly trapezoidal shape and the part of area 15 nearest to the centre of the panel 11 is formed with an upward projection 22 as seen in FIG. 2. A metal pull tab 16 comprising a ring pull 17 and a shank portion 18 with a central rib 23 is attached to the area 15, as described below, to enable the area 15 to be torn away from the can end to form an aperture. The rib 23 fits over the projection 22 to locate the pull tab 16 on the can end.

Figure 1:
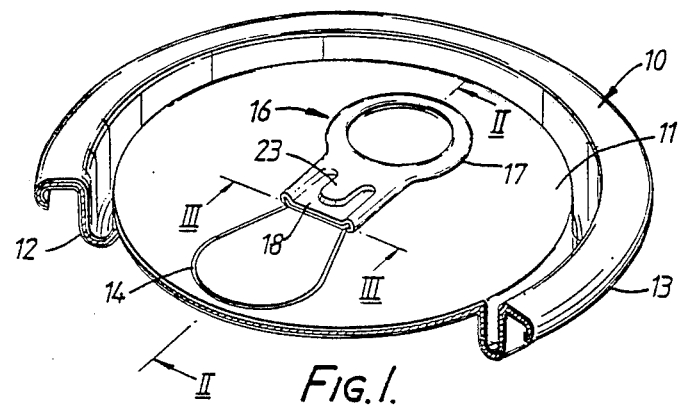
FIG. 1 is a perspective cutaway view from above of a can end with a pull tab, in accordance with a first embodiment of the invention.

The can end 10 is formed from a metal sheet, such as 0.33 mm thick aluminium alloy or 0.3 mm thick electrolytically chrome coated steel, which has been simultaneously laminated with a film (B) of a polyolefin material forming a coating 19 on the upper side of the can end and with a film (A) of a different polymeric material forming a coating 20 on the underside of the can end. The pull tab 16 is also formed from a metal sheet having different polymeric coatings on each side, the side which forms the underside of the tab 16, and in particular of its shank portion 18, being provided with a coating 21 of a polyolefin material which can be welded directly to the coating 19 on the upper side of the can end. The coating 19 may be a composite film (B) comprising an inner layer (B1) of a bonding resin which is an acid-modified polyolefin resin containing carboxyl or anhydride groups and an outer layer (B2) of a polyolefin adhered to the inner layer of said bonding resin.

DETAILED DESCRIPTION

In the forming of the can end 10, the pull tab 16 and the can end 10 are brought together and held in register under pressure while heat is supplied to the shank portion 18 of the pull tab to effect fusion of the coatings 21 and 19 and thus to weld the tab 16 securely to the area 15 of the can end. The heat may be supplied by an electrically heated tool applied to the upper side of the shank portion 18 or by induction heating. Alternatively, direct welding of coatings 21 and 19 may be effected by ultrasonic welding, using a vibrated horn applied to the upper side of the shank portion 18 while the can end 10 is supported on an anvil.

Figure 4:
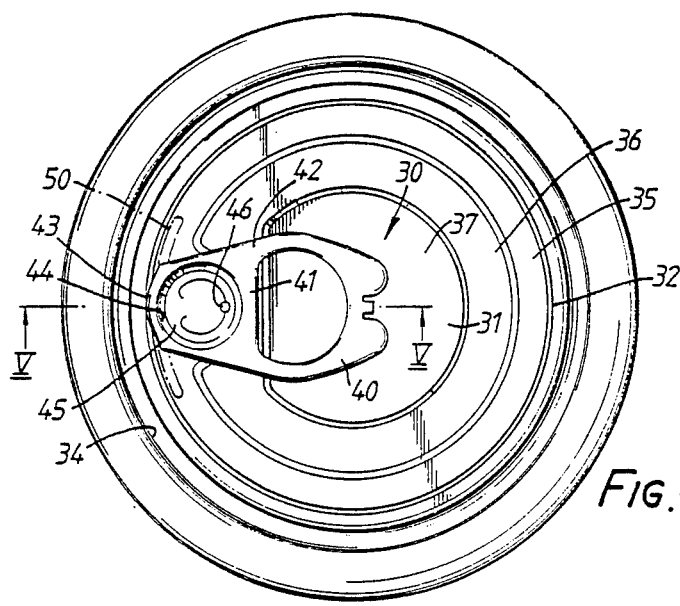
FIG. 4 is a plan view of a second embodiment of a can end having a pull tab bonded thereto for providing "full-aperture" opening.
Figure 5:
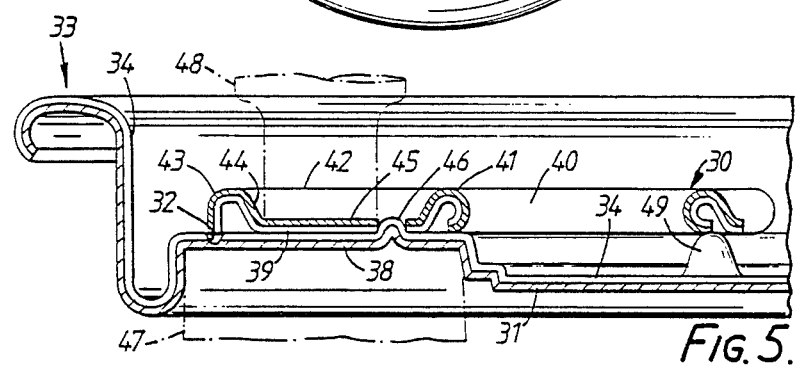
FIG. 5 is an enlarged fragmentary section on line V—V in FIG. 4.
Figure 6:
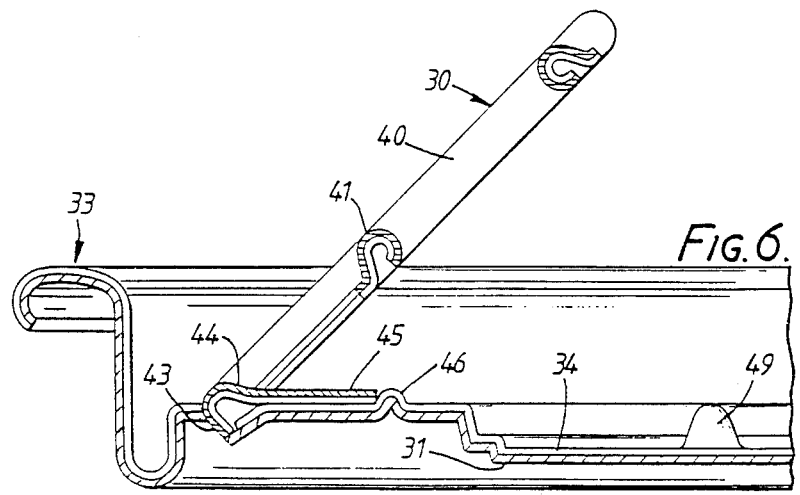
FIG. 6 is a like view to FIG. 5 but showing the can end at an initial stage of opening.

In FIGS. 4 to 6 the can end comprises a pull tab 30, the underside of which is bonded to the upper surface of a circular removable panel 31 defined by a score 32 in a can end 33, thus providing a "full-aperture" opening on removal of panel 31.

The can end 32 was blanked and drawn from a laminate of electrochrome coated steel (ECCS —sometimes called TFS) bonded to a film of polypropylene which forms a coating 34 on its upper side. The polypropylene film is preferably a composite film comprising a bonding resin layer typically 3μ thick of an acid modified polypropylene containing carboxyl or anhydride groups and a layer of polypropylene of the order of 30 μ thick. The ECCS is preferably about 0.2 mm thick.

The central panel 31 comprises an outer annulus 35, a middle annulus 36 and a central panel 37, each joined to the next by an inflection portion so that the whole of the removable panel 31 can flex to accommodate pressure changes arising when a filled can, closed by the can end, is subjected to thermal processing such as is applied to foods.

A substantially flat platform 38, best seen in FIG. 5 is raised from the level of the outer and middle annuli 35,36 and part of the central panel 37 to provide a surface to receive the pull tab 30.

The pull tab 30 is stamped from a laminate of aluminium, tinplate or ECCS with a film 39 of polypropylene on its under side, so as to have a ring portion 40, a bridge portion 41 and a pair of side portions 42 which extend from the ring portion 40, part the bridge portion 41 to converge at an apex portion 43. A pliable strap portion 44 joins the apex portion to a shank portion or bonding flap 45, which is depicted as being circular but could be any other convenient shape providing adequate bond area. A raised boss 46 on the flat platform protrudes between notches in the bridge portion 41 and bonding flap 45 as seen in FIGS. 4 and 5, so that when the tab 30 is placed upon the platform 38, the boss 46 prevents rotation of the tab and ensures the apex portion 43 is operably adjacent the score line 32.

In FIG. 5 it will be seen that the polypropylene film 39 of the tab 30 is in contact with the polypropylene film 34 covering the flat platform 38 which is shown as supported on an anvil 47. A welding tool 48 shown in dashed lines is about to be actuated to cause the polypropylene film 39 of the tab 30 to weld to the polypropylene film 34 of the platform 38 and so firmly fix the tab 30 to the can end 33. Suitable means to effect welding include ultrasonic welding, or alternatively use of a heated rod from which heat is conducted through the tab metal to the polypropylene. For ultrasonic welding, the welding horn may be of aluminium or preferably titanium. Frequencies of the order of 20,000 cps are effective for producing a strong weld.

It is desirable that the pull ring 40 be supported to prevent any risk of accidental opening and this may be achieved by providing a pair of bosses 49 extending from the central panel 31 to support the extremity of the ring pull.

In FIG. 6 the pull ring 40 has been raised so that the pliable strap 44 yields to act as a hinge for the apex portion 43 which penetrates and breaks the score 32. It will be noticed that the joint between the bonding flap 45 and the flat platform 38 remains undisturbed because the loading upon it is predominantly tensile, any peel mode having been minimised by folding of the pliable strap 44. Once the lifting of the pull ring 40 has effected initial rupture of the score 32, a pulling action on the pull ring continues fracture all round the score line to achieve a full aperture opening.

At risk of increasing the effort required for initial rupture, it is possible to provide an arcuate bead 50 (shown in dashed lines in FIG. 1 only) inboard of the score line, so that a greater length of the score 32 is initially ruptured by lifting the tab 30. The advantage is that subsequent pulling on the tab 30 is more nearly aligned to the direction of tearing along the score line.

Figure 2:
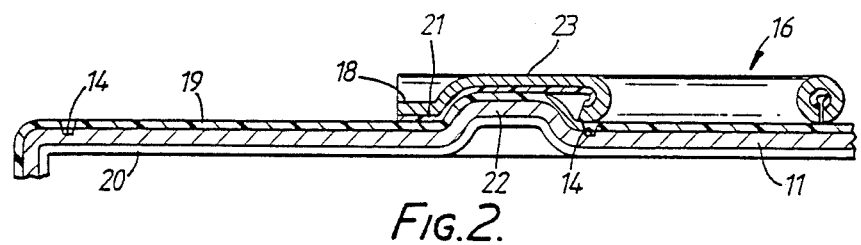
FIG. 2 is a partial cross-section on the line II—II of FIG. 1.
Figure 3:
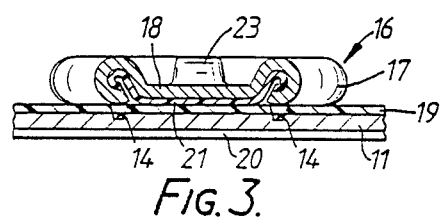
FIG. 3 is a partial cross-section, to a larger scale, on the line III—III in FIG. 1.
Figure 7:
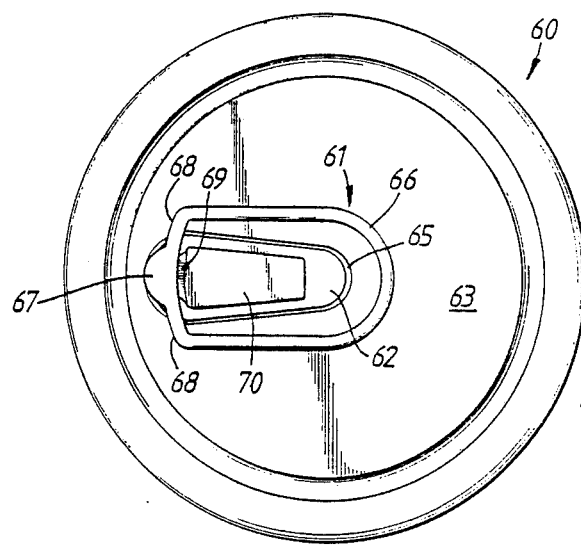
FIG. 7 is a plan view of a third embodiment of the can end, suitable for dispensing by pouring.

FIG. 7 shows somewhat diagrammatically a can end 60 suitable for closing a can filled with beer or other beverage and having a relatively small opening like that of FIGS. 1 to 3. The can end 60 comprises a pull tab 61 bonded to an openable portion 62 of the can end.

The can end 60 is stamped from a laminate of ECCS and a polypropylene film as before, so as to have a central panel 63 with a film coating 64 of polypropylene on its upper surface.

A score 65 in the central panel 63 defines the openable portion 62, which is roughly trapezoidal in shape.

The pull tab 61 is also stamped from a laminate of ECCS and polypropylene film and comprises a pull ring 66 and an apex portion 67 joined to the pull ring 66 by a pair of lateral bars 68 which join the pull ring 66 at a position overlying the unopenable portion of the central panel 63.

Figure 8:
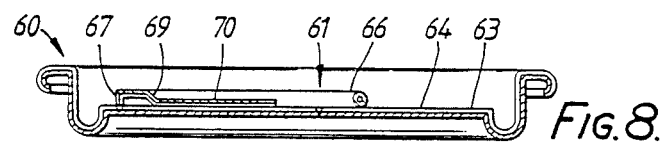
FIG. 8 is a sectional side elevation of the can end of FIG. 7.

A pliable strap 69 connects the apex portion 67 to an elongate shank portion or bonding flap 70, which has a film 71 of polypropylene on its under surface and is bonded to the openable portion 62 (as is best seen in FIG. 8) by welding the polypropylene film 71 of the bonding flap 70 to the polypropylene film 64 of the openable portion 62 of the can end. Induction heat, conduction heat or ultrasonic welding may be used to weld the flap 70 to the portion 62 of the can end 60.

Figure 9:
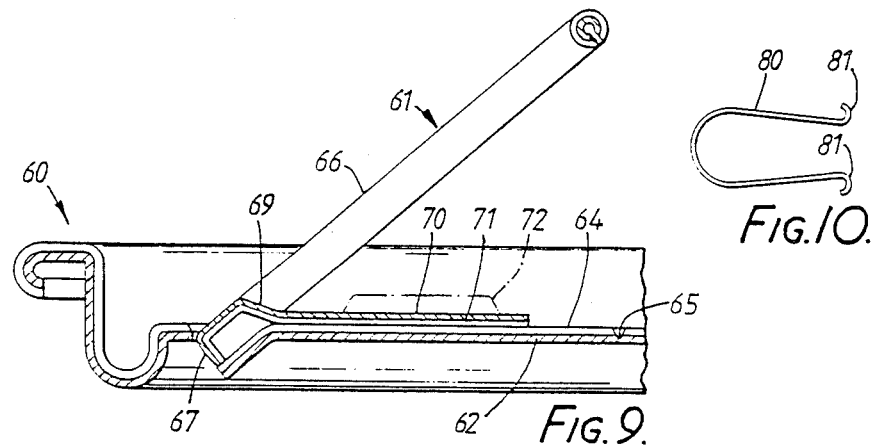
FIG. 9 is a enlarged fragmentary section of the can end of FIGS. 7 and 8 at an initial stage of opening.

It will be noticed in FIG. 7 that the extremity of the apex portion 67 is rounded to a peripheral curvature nearly the same as that of the score 65. In this way it is possible to control how much of the score 65 is to be ruptured during initial lifting of the pull ring 66. FIG. 9 shows the initial rupture position of the apex portion 67 and it will be seen that the pliable strap 69 has acted as a hinge with the predominant load on the bond of flap 70 to openable portion 62 being tensile.

If desired, a hollow bead can be stamped in the bonding flap (shown dashed at 72 in FIG. 9) and a complementary hollow rib (not shown) can be embossed in the openable portion 62 of the can end. The bond between such a rib and hollow bead will, of course, be in pure shear mode of loading, which is the optimum mode of stressing the weld to decrease any risk of a peeling mode.

Figure 10:
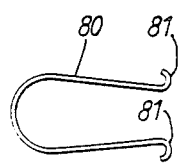
FIG. 10 is a scrap view of an alternative form of score line.

Some packers of beverages prefer centre venting (initial opening) of can end, so it is within the scope of this invention to mount the pull ring 66 of FIG. 7 with the apex portion 67 at the centre of the can end. However, many purchasers like to drink out of the can, which is permitted by by the arrangement of FIG. 7. In another variation, illustrated in FIG. 10, the score 80 is "open ended", terminating in anchorage curls 81, so that the openable portion is not torn completely from the can end when opened.

Whilst this invention has been described in terms of can ends and tabs made from laminates of polypropylene and ECCS, the ECCS can, if desired, be replaced by aluminium or tinplate. The polypropylene may, if desired, be replaced by nylon or polyethylene terephthalate (PET), but polymeric films on the tab and can end will have common monomer origin to ensure efficient autogenous welding.

We claim:

1. A metal can end provided with a score line defining a detachable area of the can which can be detached by tearing along the score line to form an aperture and with a metal pull tab having a shank portion bonded to the upper side of said detachable area, wherein the upper side of the can end is provided with a protective polymer coating and the under side of the shank of the pull tab is also provided with a polymer coating, the polymer of the surface at least of said coating on the shank portion being based on the same monomer as the polymer of the surface at least on the coating on the upper side of the can end, and wherein said surfaces are bonded directly to one another by welding to provide a bond of sufficient strength that the said detachable area of the can end can be detached by using the pull tab without the shank portion of the pull tab becoming detached from said detachable area.

2. A can end according to claim 1 characterised in that the upper and under sides of the can end both have protective polymer coatings which have been applied simultaneously.

3. A can end according to claim 1 characterised in that the coatings on the upper side of the can end and on the under side of the shank portion of the pull tab both have an outer layer of a polyamide.

4. A can end according to claim 3 characterised in that the coatings on the upper side of the can end and on the under side of the shank of the pull tab both consist of a composite film comprising an inner layer of a bonding resin which is an acid-modified polyolefin resin containing carboxyl or anhydride groups and an outer layer of a polyamide adhered to the inner layer of said bonding resin.

5. A can end according to claim 1 characterised in that the coatings on the upper side of the can end and on the under side of the shank portion of the pull tab are both of a polyolefin or have an outer layer of a polyolefin.

6. A can end according to claim 5 characterised in that the coatings on the upper side of the can end and on the under side of the shank of the pull tab both consist of a composite film comprising an inner layer of a bonding resin which is an acid-modified polyolefin resin containing carboxyl or anhydride groups and an outer layer of a polyolefin adhered to the inner layer of said bonding resin.

7. A can end according to claim 1 characterised in that the coatings on the upper side of the can end and on the under side of the shank portion of the pull tab both have an outer layer of a polyester.

8. A can end according to claim 7 characterised in that the coatings on the upper side of the can end and on the under side of the shank portion of the pull tab both consist of a composite film comprising an inner layer of a substantially non-crystalline linear polyester having a softening point below 150° C. and a melting point between 150° and 240° C. and an outer layer of a linear polyester having a melting point above 220° C.

9. A can end according to claim 8 characterised in that the linear polyester with a melting point above 220° C. is polyethylene terephthalate.

10. A can end according to claim 1 characterized in that the coating on the pull tab has been thermally welded to the coating on the can end.

11. A can end according to claim 1 characterised in that the coating on the pull tab has been ultrasonically welded to the coating on the can end.

12. A can end according to claim 1 characterised in that a central rib on the shank portion of the pull tab fits over a projection on the can end to locate the pull tab thereon.

13. A metal can end provided with a score line defining an area of the can end which can be detached by tearing along the score line to form an aperture and with a metal pull tab having a shank portion attached to the upper side of said area, characterised in that the upper side of the can end and the under side of the shank portion of the pull tab are provided with respective protective coatings of polymer directly welded to one another, the coatings being of polymer selected from the group consisting of polypropylene, polyamides and polyethylene terephthalate, each of said coatings being a composite film comprising an outer layer of the polymer and an inner layer of a bonding resin bonded to the metal, the bonding resin being an acid-modified polyolefin resin containing carboxyl or anhydride groups when the polymer is polypropylene or a polyamide, and being a substantially non-crystalline linear polyester having a softening point below 150° C. and a melting point between 150° C. and 240° C. when the polymer is polyethylene terephthalate, the polymer of the outer layer of the coating on the shank portion being based on the same monomer as the polymer of the outer layer of the coating on the upper side of the can end.

14. A process for forming a metal can end, of the kind provided with a core line defining a detachable area which can be detached by tearing along the score line to form an aperture and with a metal pull tab having a shank portion bonded to the upper side of the said detachable area, the process comprising forming the can end from metal stock with a protective polymer coating on its upper side; forming the shank portion of the pull tab with a polymer coating whose surface at least is based on the same monomer as the surface at least of the coating on the upper side of the can end; and directly welding the surface of the polymer coating on the upper side of the can end to the surface of the coating on the underside of the shank portion to provide a bond of sufficient strength that the said detachable area of the can end can be detached without the shank portion of the pull tab becoming detached from said detachable area.

15. A process according to claim 14 characterised in that the coating on the under side of the shank portion of the pull tab is thermally welded to the polymer coating on the can end.

16. A process according to claim 15 characterised in that the pull tab and the can end are brought together and held in register under pressure while heat is supplied to the shank portion to effect fusion of the coatings.

17. A process according to claim 16 characterised in that heat is supplied from an electrically heated tool applied to the upper side of the shank portion.

18. A process according to claim 16 characterised in that heat is supplied by induction heating.

19. A process according to claim 14 characterised in that the coating on the under side of the shank portion of the pull tab is ultrasonically welded to the polymer coating on the can end.

20. A process according to claim 19 characterised in that the ultrasonic welding is effected by applying a vibrated horn to the upper side of the shank portion of the pull tab while the can end is supported on an anvil.

21. A process according to claim 20 characterised in that the vibrated horn is of titanium.

22. A process according to claim 20 characterised in that the horn is vibrated at a frequency of about 20,000 cps.

* * * * *